United States Patent
Kinoshita et al.

(10) Patent No.: US 7,774,570 B2
(45) Date of Patent: Aug. 10, 2010

(54) STORAGE VIRTUALIZATION SWITCH

(75) Inventors: Tetsuya Kinoshita, Kawasaki (JP);
Toshitaka Yanagisawa, Kawasaki (JP);
Takaaki Yamato, Kawasaki (JP);
Toshiaki Takeuchi, Kawasaki (JP); Jun Takeuchi, Kawasaki (JP); Atsushi Shinohara, Kawasaki (JP); Yusuke Kurasawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 531 days.

(21) Appl. No.: 11/848,952

(22) Filed: Aug. 31, 2007

(65) Prior Publication Data

US 2008/0104338 A1  May 1, 2008

(30) Foreign Application Priority Data

Oct. 30, 2006  (JP) ............................. 2006-294549

(51) Int. Cl.
*G06F 12/16* (2006.01)

(52) U.S. Cl. ...................................... 711/170; 711/152

(58) Field of Classification Search ................. 711/152, 711/170

See application file for complete search history.

(56) References Cited

U.S. PATENT DOCUMENTS

| | | | |
|---|---|---|---|
| 2005/0010688 A1 | 1/2005 | Murakami et al. | |
| 2005/0034013 A1* | 2/2005 | Yamamoto et al. | 714/6 |
| 2005/0050256 A1 | 3/2005 | Maki et al. | |
| 2006/0080416 A1* | 4/2006 | Gandhi | 709/220 |
| 2007/0124551 A1* | 5/2007 | Taninaka | 711/161 |
| 2007/0233992 A1* | 10/2007 | Sato | 711/170 |
| 2008/0022058 A1* | 1/2008 | Nadathur et al. | 711/162 |

* cited by examiner

*Primary Examiner*—Shane M Thomas
*Assistant Examiner*—Kaushikkumar Patel
(74) *Attorney, Agent, or Firm*—Staas & Halsey LLP

(57) ABSTRACT

The storage virtualization switch is capable of correctly designating a virtual target when a host computer accesses the virtual target. A dummy virtual target, which corresponds to a virtual target, is put into an effective state after the virtual target is put into the ineffective state when the virtual target is put into the ineffective state, and the virtual target is put into an effective state after the dummy virtual target, which corresponds to the virtual target, is put into the ineffective state when the virtual target is put into the effective state.

6 Claims, 5 Drawing Sheets

FIG.3A

| VIRTUAL TARGET | PORT ID NUMBER | DUMMY VIRTUAL TARGET | PORT ID NUMBER |
|---|---|---|---|
| 1 2 a | 1 0 1 | 1 3 a | NONE |
| 1 2 b | 2 0 1 | 1 3 b | NONE |
| 1 2 c | 3 0 1 | 1 3 c | NONE |

FIG.3B

| VIRTUAL TARGET | PORT ID NUMBER | DUMMY VIRTUAL TARGET | PORT ID NUMBER |
|---|---|---|---|
| 1 2 a | NONE | 1 3 a | 1 0 1 |
| 1 2 b | 2 0 1 | 1 3 b | NONE |
| 1 2 c | 3 0 1 | 1 3 c | NONE |

FIG.3C

| VIRTUAL TARGET | PORT ID NUMBER | DUMMY VIRTUAL TARGET | PORT ID NUMBER |
|---|---|---|---|
| 1 2 a | NONE | 1 3 a | 1 0 1 |
| 1 2 b | 2 0 1 | 1 3 b | NONE |
| 1 2 c | NONE | 1 3 c | 3 0 1 |

FIG.3D

| VIRTUAL TARGET | PORT ID NUMBER | DUMMY VIRTUAL TARGET | PORT ID NUMBER |
|---|---|---|---|
| 1 2 a | NONE | 1 3 a | 1 0 1 |
| 1 2 b | 2 0 1 | 1 3 b | NONE |
| 1 2 c | 3 0 1 | 1 3 c | NONE |

| VIRTUAL TARGET | PORT ID NUMBER |
|---|---|
| 1 2 a | 1 0 1 |
| 1 2 b | 2 0 1 |
| 1 2 c | 3 0 1 |

| VIRTUAL TARGET | PORT ID NUMBER |
|---|---|
| 1 2 a | NONE |
| 1 2 b | 2 0 1 |
| 1 2 c | NONE |

| VIRTUAL TARGET | PORT ID NUMBER |
|---|---|
| 1 2 a | 3 0 1 |
| 1 2 b | 2 0 1 |
| 1 2 c | 1 0 1 |

STORAGE VIRTUALIZATION SWITCH

BACKGROUND OF THE INVENTION

The present invention relates to a storage virtualization switch having: a plurality of physical ports, to which at least one host computer and at least one physical storage unit can be connected; storage virtualization means for constituting at least one virtual storage unit by using a part or a whole of a storage area of the physical storage unit, and virtual target constituting means for constituting at least one virtual target, which acts as a target of the virtual storage unit with respect to the host computer.

In computer systems, a storage virtualization technology, in which a host computer recognizes combined storage areas of physical storage units, e.g., magnetic disk units, as a virtual storage unit, has been applied.

Japanese Patent Gazette No. 2005-25485 discloses a conventional technology relating to a storage virtualization switch, which virtualizes physical storages with respect to a computer system. Namely, a port ID number assigned to a virtual storage unit, which is generated by the storage virtualization switch, is made equal to that of an existing physical storage unit. By using such technology, a host computer can access the virtual storage unit with reference to the port ID number of the existing physical storage unit without stopping the computer system and changing settings.

FIG. 4 is an explanation view of a computer system A using conventional storage virtualization switches.

The computer system A shown in FIG. 4 comprises: a host computer 2; a disk enclosure 6 including a plurality of magnetic disk units 4, which act as physical storage units; and the storage virtualization switches Va. Each of the storage virtualization switches Va has a plurality of physical ports 8, to which the host computer 2 and the disk enclosure 6 are connected by fiber channel interfaces. Structures of the storage virtualization switches Va are same, so the computer system A has a redundant structure.

The structure of the storage virtualization switch Va is shown in FIG. 5.

The storage virtualization switch Va has a control section 20, which is constituted by a CPU, memories, etc. The CPU of the control section 20 executes firmwares stored in ROMs, so that the control section 20 acts as storage virtualization means 22 and effective/ineffective control means 24.

The storage virtualization switch Va further has virtual target constituting means 30, which is constituted by a CPU, LSIs, memories, etc. The CPU executes firmwares stored in ROMs and functions of the LSIs.

The storage virtualization means 22 combines parts or wholes of storage areas of the magnetic disk units 4 in the disk enclosure 6 so as to form one or a plurality of virtual storage units 10 (see FIG. 4).

The virtual target constituting means 30 constitutes virtual targets 12a, 12b and 12c, which act as targets of each of the virtual storage units 10, with respect to the host computer 2 (see FIG. 4).

The effective/ineffective control means 24 monitors conditions of the magnetic disk units 4 and paths connected to the magnetic disk units 4. The effective/ineffective control means 24 makes the virtual target constituting means 30 change the state of the virtual target, which corresponds to the magnetic disk unit 4 or the path whose condition is varied by failure, to an effective state, in which the virtual target is allowed to be connected to the host computer 2, or an ineffective state, in which the virtual target is prohibited to be connected to the host computer 2, on the basis of the variation of the monitored condition.

When the virtual target constituting means 30 puts the virtual target into the effective state on the basis of instruction from the effective/ineffective control means 24, the virtual target constituting means 30 assigns a port ID number to the virtual target. On the other hand, when the virtual target constituting means 30 puts the virtual target into the ineffective state, the virtual target constituting means 30 releases the port ID number assigned to the virtual target. Note that, releasing the port ID number assigned to the virtual target means that breaking off the correspondence relationship between the virtual target and the port ID number. The released port ID number can be assigned to another virtual target when another virtual target is newly put into the effective state.

Next, action of the effective/ineffective control means 24 and the virtual target constituting means 30 will be explained.

When the computer system A is turned on, the effective/ineffective control means 24 checks conditions of the magnetic disk units 4 and the paths connected to the magnetic disk units 4. If no failures are detected, the effective/ineffective control means 24 sends an instruction to the virtual target constituting means 30 so as to put the virtual targets 12a, 12b and 12c into the effective states, in which they can be connected to the host computer 2.

Upon receiving the instruction, the virtual target constituting means 30 puts the virtual targets 12a, 12b and 12c into the effective states and allows them to be connected to the host computer 2.

At that time, the virtual target constituting means 30 respectively assigns serial port ID numbers to the virtual targets 12a, 12b and 12c. The port ID numbers assigned to the virtual targets 12a, 12b and 12c are shown in FIG. 6A. Note that, in the shown example, highest-order digits of the port ID numbers are serial numbers.

Further, the effective/ineffective control means 24 monitors conditions of the magnetic disk units 4 and the paths connected to the magnetic disk units 4. The effective/ineffective control means 24 instructs the virtual target constituting means 30 to change the state of the virtual target, which corresponds to the magnetic disk unit 4 or the path whose condition is varied, on the basis of the variation of the monitored condition.

When the effective/ineffective control means 24 instructs to put the designated virtual target into the ineffective state, the virtual target constituting means 30 puts the designated virtual target into the ineffective state and releases the port ID number assigned to the designated virtual target, so that the assigned port ID number can be assigned to another virtual target.

On the other hand, when the effective/ineffective control means 24 instructs to put the designated virtual target into the effective state, the virtual target constituting means 30 assigns the smallest released port ID number to the designated virtual target if a released port ID number or numbers exist; the virtual target constituting means 30 generates a new port ID number, which is the next serial number following the latest released port ID number, and assigns the new port ID number to the designated virtual target if no released port ID numbers exist.

The host computer 2 identifies the virtual targets 12a, 12b and 12c on the basis of the assigned port ID numbers, so that the host computer 2 can access the object virtual storage unit or units 10.

In some cases, the port ID numbers of the virtual targets 12a, 12b and 12c are changed when the states of the virtual targets 12a, 12b and 12c are changed between the effective state and the ineffective state. By changing the port ID numbers, the host computer 2 cannot correctly identify the virtual targets when the host computer 2 accesses the virtual storage units 10.

For example, when the virtual targets 12a and 12c are put into the ineffective states from the states shown in FIG. 6A, the virtual target constituting means 30 releases the port ID numbers 101 and 301 as shown in FIG. 6B.

If the virtual target 12c is put into the effective state again, the virtual target constituting means 30 assigns the smallest port ID number 101, which is selected from the released port ID numbers 101 and 301, to the virtual target 12c (see FIG. 6C).

Next, if the virtual target 12a is put into the effective state again, the virtual target constituting means 30 assigns the released port ID number 301 to the virtual target 12a (see FIG. 6C).

By changing the states of the virtual targets 12a and 12c between the ineffective state and the effective state, the port ID number of the virtual target 12a is changed from 101 to 301; the port ID number of the virtual target 12c is changed from 301 to 101.

Therefore, the host computer 2 cannot correctly identify the object virtual targets on the basis of the port ID numbers.

If the function performed by the control section 20, which executes the firmwares, directly changes the port ID numbers of the virtual targets 12a, 12b and 12c, said problem can be solved.

However, in many cases, the virtual target constituting means 30, which is a basic switching means of the storage virtualization switch Va, is constituted by a dedicated hardware, which is separated from the control section 20 acting as the storage virtualization means 22 and the effective/ineffective control means 24. Therefore, the control section 20 cannot assign the port ID numbers, which are assigned by the virtual target constituting means 30.

SUMMARY OF THE INVENTION

The present invention was conceived to solve the above described problems.

An object of the present invention is to provide a storage virtualization switch, in which a port ID number of a virtual target is not changed even if a state of the virtual target is changed and which is capable of correctly designating a virtual target when a host computer accesses the virtual target.

To achieve the object, the present invention has following structures.

Namely, the storage virtualization switch of the present invention comprises: a plurality of physical ports, to which at least one host computer and at least one physical storage unit can be connected; storage virtualization means for constituting at least one virtual storage unit by using a part or a whole of a storage area of the physical storage unit; virtual target constituting means for constituting at least one virtual target, which acts as a target of the virtual storage unit with respect to the host computer; first control means for controlling the virtual target constituting means to generate the virtual target; second control means for controlling the virtual target constituting means to selectively put the virtual target into an effective state, in which the virtual target is allowed to be connected to the host computer, or an ineffective state, in which the virtual target is prohibited to be connected to the host computer; and third control means for controlling the virtual target constituting means to generate at least one dummy virtual target, which corresponds to the virtual target, the virtual target constituting means assigns a port ID number to the virtual target when the virtual target is put into the effective state, the virtual target constituting means releases the port ID number of the virtual target when the virtual target is put into the ineffective state, the second control means puts the dummy virtual target, which corresponds to the virtual target, into the effective state after the virtual target is put into the ineffective state when the virtual target is put into the ineffective state, and the second control means puts the virtual target into the effective state after the dummy virtual target, which corresponds to the virtual target, is put into the ineffective state when the virtual target is put into the effective state.

In the storage virtualization switch, when the states of the one virtual target and the dummy virtual target, which corresponds to the one virtual target, are changed, the second control means may hold the states of other virtual targets.

When the virtual target is put into the ineffective state, the dummy virtual target, which corresponds to the virtual target, is put into the effective state after the virtual target is put into the ineffective state. Therefore, the port ID number, which has been released by putting the virtual target into the ineffective state, is assigned to the dummy virtual target, which corresponds to the ineffective virtual target, so the released port ID number will not be assigned to other virtual targets.

In the storage virtualization switch, the virtual target constituting means may assign the smallest released port ID number to the virtual target if released port ID number or numbers exist, and the virtual target constituting means may generate a new port ID number, which is the next serial number following the latest port ID number, and assign the same to the virtual target if no released port ID numbers exist, when the second control means puts the virtual target into the effective state.

In the storage virtualization switch, the third control means may make the virtual target constituting means set a WWN, which is not recognized by the host computer, as a WWN of the dummy virtual target. With this structure, the dummy virtual target is not recognized by the host computer.

The storage virtualization switch may further comprise fourth control means for controlling the virtual target constituting means to delete the virtual target, and the second control means may put the dummy virtual target, which corresponds to the virtual target, into the effective state when the virtual target is deleted. With this structure, the port ID number to be deleted is assigned to the dummy virtual target, which corresponds to the virtual target to be deleted, and is not released. Therefore, the port ID number will not be assigned to other virtual targets.

In the storage virtualization switch, the third control means may make the virtual target constituting means generate the dummy virtual targets, whose number is equal to or more than the maximum number of the virtual targets, before the first control means generates the virtual targets, and the second control means may put one of the dummy virtual targets into the ineffective state, and generate the virtual target in the effective state, or the second control means may generate the virtual target, which corresponds to the one of the dummy virtual targets, in the ineffective state, put the dummy virtual target into the ineffective state, and put the virtual target into the effective state. With this structure, the port ID numbers are assigned to the dummy virtual targets previously generated, and the port ID number of the one dummy virtual target can be assigned to the virtual target corresponding to the one dummy virtual target when the virtual target is generated.

In the storage virtualization switch, the second control means may monitor conditions of the physical storage unit and paths connected to the physical storage unit and make the virtual target constituting means change the state of the virtual target, which corresponds to the physical storage or the path whose condition is varied, on the basis of the variation of the monitored condition.

By employing the storage virtualization switch of the present invention, the port ID number of the virtual target is not changed when the state of the virtual target is changed between the effective state and the ineffective state. Therefore, the virtual target can be securely designated when the host computer accesses the virtual storage unit.

BRIEF DESCRIPTION OF THE DRAWINGS

Embodiments of the present invention will now be described by way of examples and with reference to the accompanying drawings, in which:

FIGS. 3A-3D are explanation views explaining change of port ID numbers performed in the storage virtualization switch of the present invention;

DETAILED DESCRIPTION OF THE EMBODIMENTS

Preferred embodiments of the present invention will now be described in detail with reference to the accompanying drawings.

Figure 1:
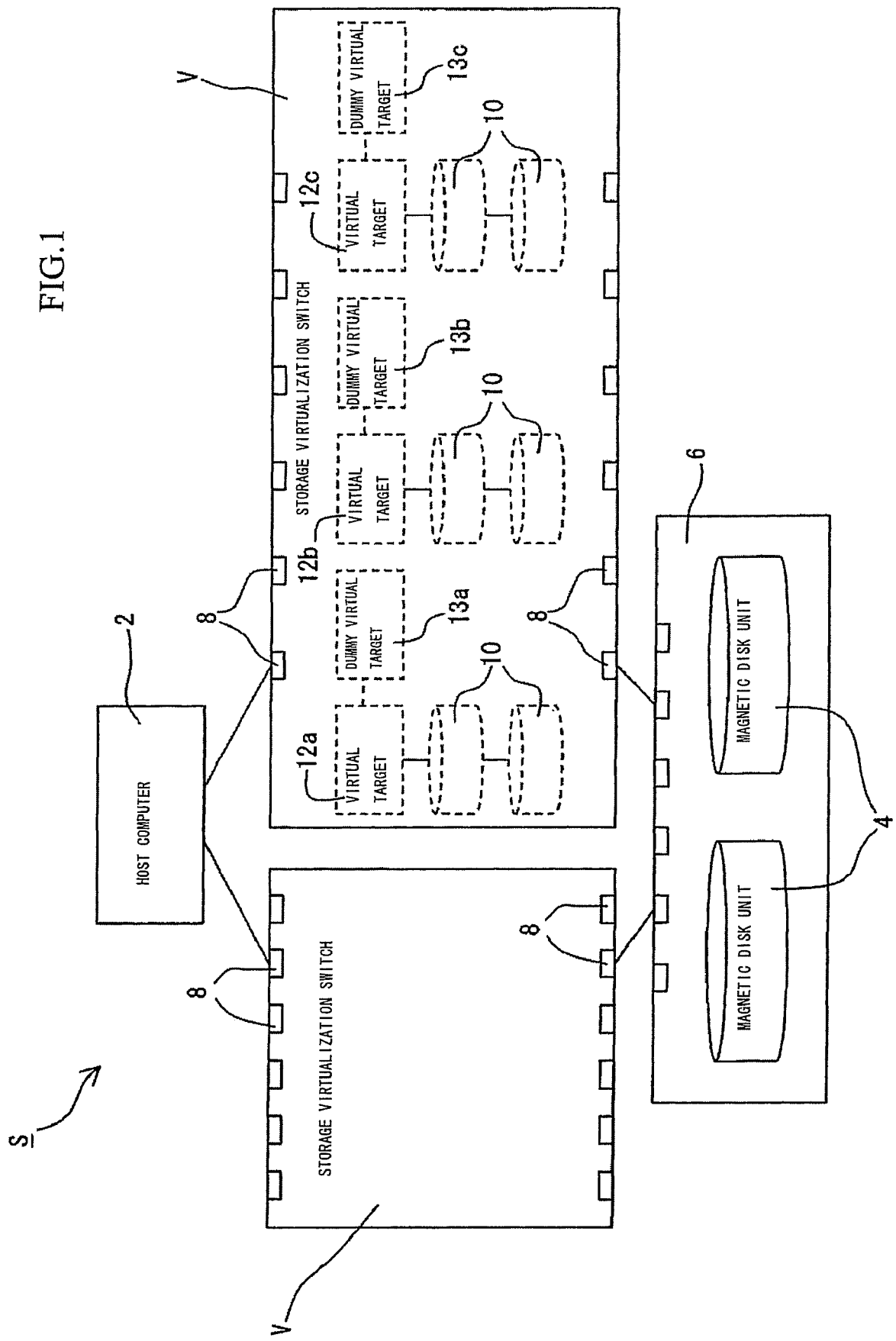
FIG. 1 is an explanation view of a computer system including the storage virtualization switches of the present invention.

FIG. 1 is an explanation view of a computer system S including the storage virtualization switches of the present embodiment, which are capable of virtualizing storage units.

The computer system S comprises: a host computer 2; a disk enclosure 6 including a plurality of magnetic disk units 4, which act as physical storage units; and a plurality of storage virtualization switches V. Each of the storage virtualization switches V has a plurality of physical ports 8, to which the host computer 2 and the disk enclosure 6 can be connected by fiber channel interfaces. The storage virtualization switches V have the same structures. Therefore, the computer system S is a so-called redundant system. Note that, in FIG. 1, virtual targets 12a, 12b and 12c and virtual storage units 10 of the left storage virtualization switch V are omitted.

Figure 2:
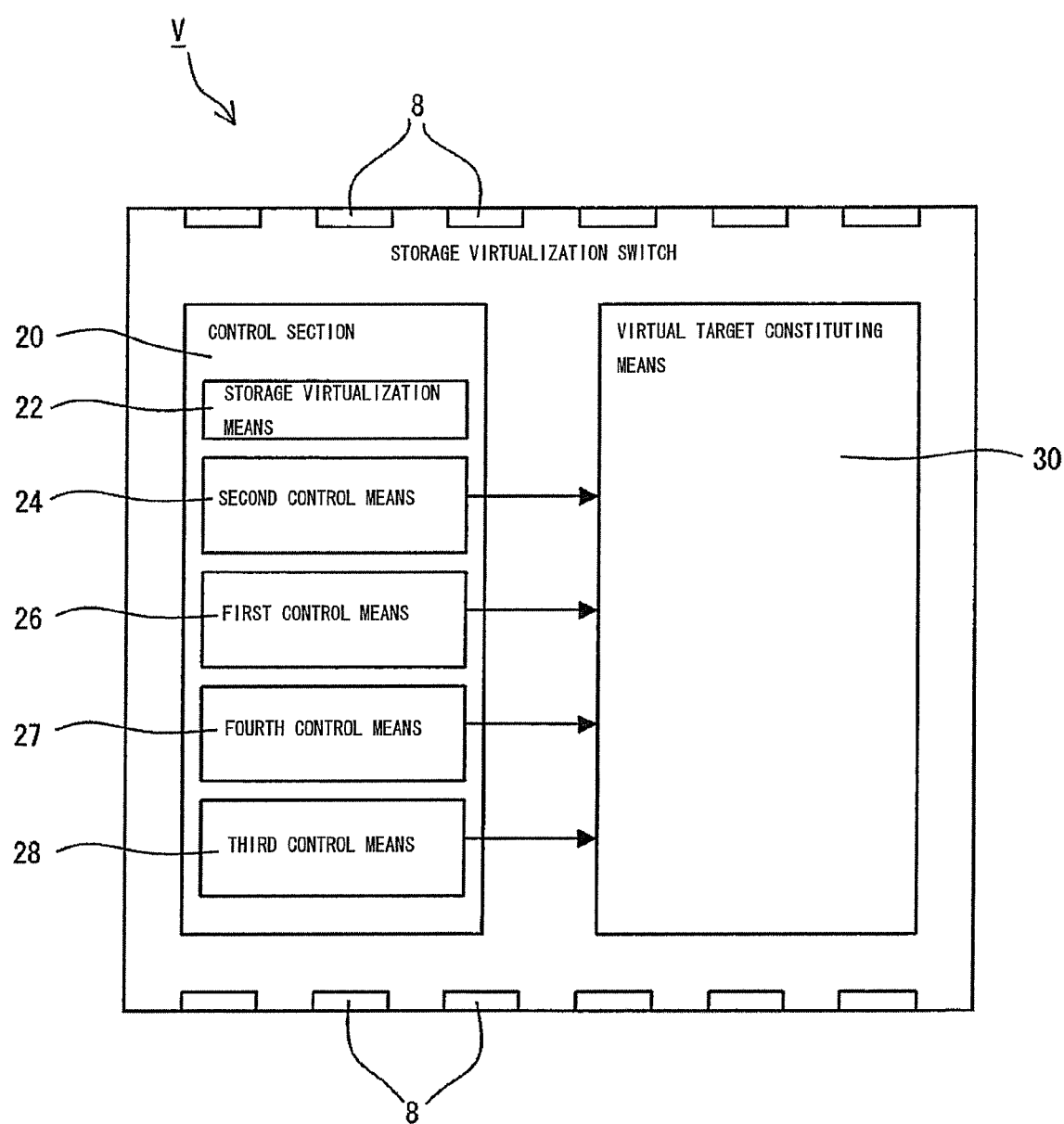
FIG. 2 is a block diagram of the storage virtualization switch of the present invention.
Figure 4:
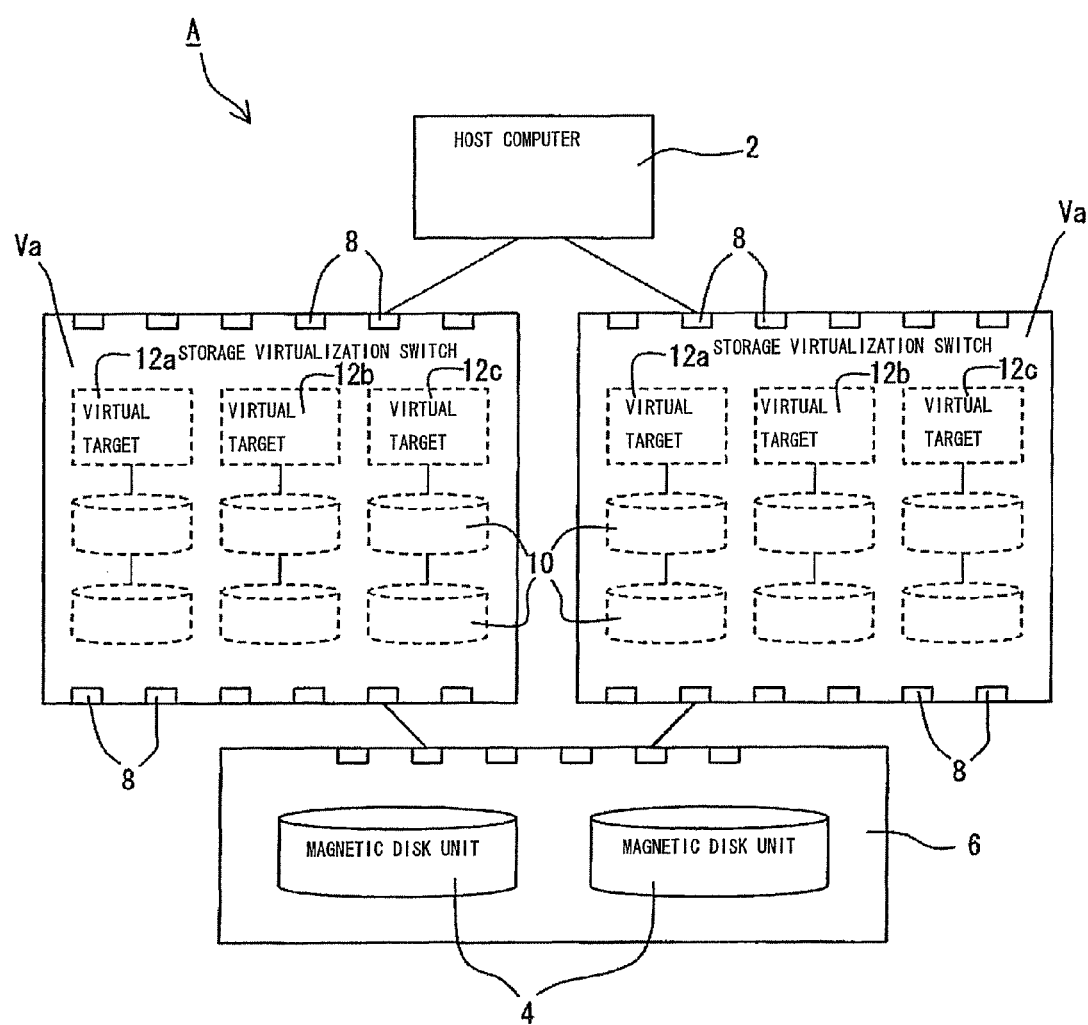
FIG. 4 is an explanation view of a computer system including the conventional storage virtualization switch.

FIG. 2 is a block diagram of the storage virtualization switch V of the present embodiment.

The storage virtualization switch V has the physical ports 8, to which the host computer 2 and the disk enclosure 6 can be connected by the fiber channel interfaces, and a control section 20 including a CPU, memories, etc. The CPU of the control section 20 executes firmwares stored in ROMs so as to perform functions of storage virtualization means 22, first control means 26, second control means 24, third control means 28 and fourth control means 27.

The storage virtualization switch V further has virtual target constituting means 30, which includes a CPU and LSIs, etc. The CPU of the virtual target constituting means 30 executes firmwares stored in ROMs and functions of the LSIs.

In the storage virtualization switch V, the virtual target constituting means 30, which is one of basic switching means of the storage virtualization switch V, is constituted by a dedicated hardware separated from the control section 20, which acts as said means 22, 24, 26, 27 and 28. The control section 20 cannot control port ID numbers, but they are controlled by the virtual target constituting means 30.

Figures 5, 6A, 6B, 6C:
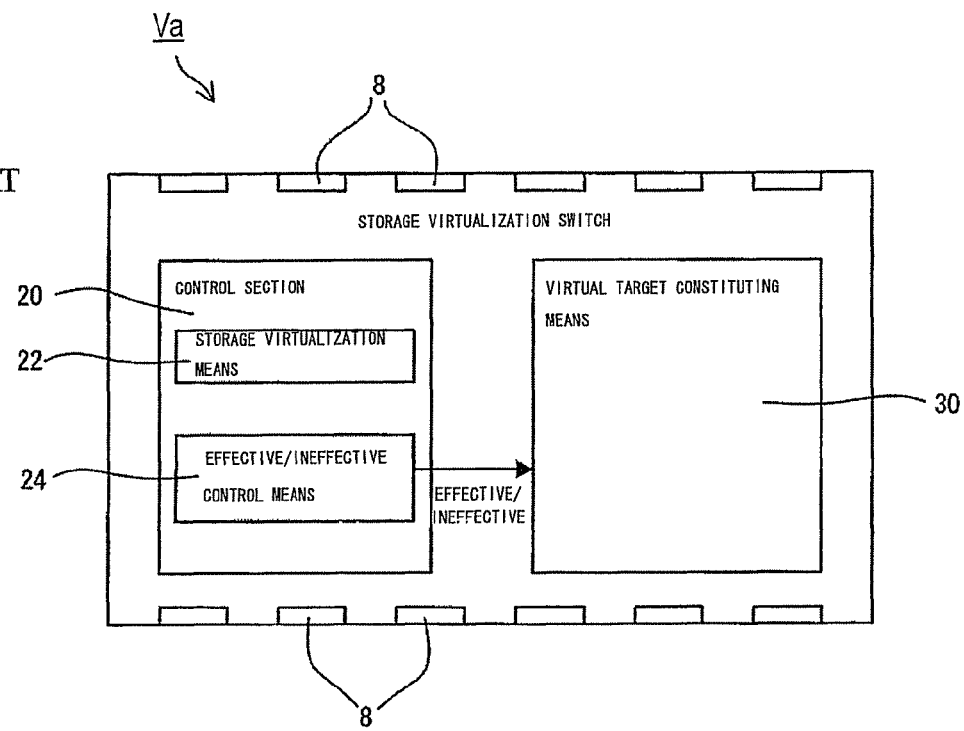
FIG. 5 is a block diagram of the conventional storage virtualization switch.
FIGS. 6A-6C are explanation views explaining change of port ID numbers performed in the conventional storage virtualization switch.

Functions of the virtual target constituting means 30 are the same as those of the conventional storage virtualization switch shown in FIG. 5.

The storage virtualization means 22 constitutes at least one virtual storage unit 10 by using a part or a whole of storage areas of the physical storage units 4 in the disk enclosure 6 (see FIG. 1).

The first control means 26 is means for controlling generation of the virtual targets. When the computer system S is turned on, the first control mans 26 instructs the virtual target constituting means 30 to generate the virtual targets 12a, 12b and 12c, which act as targets of the virtual storage units 10 with respect to the host computer 2, on the basis of generation data of the virtual storage units 10 and the virtual targets corresponding thereto, which have been previously inputted by an operator. Note that, the generation data of the virtual storage units and the virtual targets are determined on the basis of data for defining structures of the virtual storage units 10, which have been previously inputted, by the operator, to the storage virtualization switches V via the host computer 2 as initial data. The generation data are stored in a memory, e.g., nonvolatile memory, of the control section 20. The generation data of the virtual storage units and the virtual targets include data for identifying storage areas of the magnetic disk units 4 constituting the virtual storage units 10, data for defining the virtual targets corresponding to the virtual storage units 10, etc.

In the storage virtualization switch V of the present embodiment, the third control means 28 instructs the virtual target constituting means 30 to generate dummy virtual targets 13a, 13b and 13c, which respectively correspond to the virtual targets 12a, 12b and 12c, when the computer system S is turned on. Namely, the third control means 28 is means for controlling generation of the dummy virtual targets.

At that time, the third control means 28 makes the virtual target constituting means 30 set WWNs (World Wide Names), which are not recognized by the host computer 2, as WWNs of the dummy virtual targets. For example, an impossible WWWN address "00: 00: 00: 00: 00: 00: 00: 00" is assigned to the dummy virtual target. By assigning the impossible addresses, the dummy virtual targets 13a, 13b and 13c can be prevented to be recognized by the host computer 2.

The virtual target constituting means 30 constitutes the virtual targets 12a, 12b and 12c and the dummy virtual targets 13a, 13b and 13c, which respectively correspond to the virtual targets 12a, 12b and 12c, on the basis of the instructions from the first control means 26 and the third control means 28 (see FIG. 1).

The fourth control means 27 instructs the virtual target constituting means 30 to delete an optional virtual target or targets. Namely, the fourth control means 27 is means for controlling deletion of the virtual targets.

Upon receiving the instruction, the virtual target constituting means 30 deletes the designated virtual target or targets.

The second control means 24 is the same as the effective/ineffective control means 24 of the conventional storage virtualization switch (see FIG. 5). Namely, the second control means 24 monitors conditions of the magnetic disk units 4 and the paths connected to the magnetic disk units 4. The second control means 24 instructs the virtual target constituting means 30 to change a state of the virtual target, which corresponds to the magnetic disk unit 4 or the path whose condition is varied, between an effective state, in which the virtual target is allowed to be connected to the host computer 2, and an ineffective state, in which the virtual target is prohibited to be connected to the host computer 2, on the basis of the variation of the monitored condition.

Namely, when a failure occurs in the magnetic disk unit 4 or the path, the second control unit 24 puts the virtual target corresponding to the virtual storage unit 10, which uses the faulty magnetic disk unit 4 or path, into the ineffective state. When the failure is cleared, the second control unit 24 puts said virtual target into the effective state.

Note that, the present state (the effective state or the ineffective state) of each virtual target is stored by a flag of the virtual target, which is included in the assigned memory of the virtual target constituting means 30 and which is capable of indicating if the virtual target is in the effective state or ineffective state, and managed.

When the second control means 24 instructs to put one virtual target into the ineffective state, the virtual target constituting means 30 puts the designated virtual target into the ineffective state and releases the port ID number of the designated virtual target, so that the port ID number can be assigned to another virtual target.

When the second control means 24 instructs to put one virtual target into the effective state, the virtual target constituting means 30 puts the designated virtual target into the effective state and assigns a port ID number. If the released port ID number or numbers exist, the virtual target constituting means 30 assigns the smallest released port ID number to the virtual target; if no released port ID numbers exist, the virtual target constituting means 30 generates a new port ID number, which is the next serial number following the latest port ID number, and assigns the new port ID number to the virtual target.

The host computer 2 identifies the virtual targets 12a, 12b and 12c on the basis of the port ID numbers and accesses the optional virtual storage unit or units 10.

The storage virtualization switch V of the present embodiment is characterized by the second control means 24 switching the virtual targets between the effective state and the ineffective state.

In case of changing the state of the designated virtual target to the ineffective state, firstly the second control means 24 holds the states of the rest of the virtual targets so as not to change the states thereof. Successively, the second control means 24 makes the virtual target constituting means 30 put the designated virtual target into the ineffective state and puts the dummy virtual target, which corresponds to the designated virtual target, into the effective state. Then, the second control means 24 releases the rest of the virtual targets.

For example, in case that the second control means 24 is started by an interrupting trigger of the CPU, the states of the virtual targets are held by prohibiting the interruption of the trigger so that a new switching process can be prevented. On the other hand, the states of the virtual targets are released by allowing the interruption.

For example, in case of switching the state of the virtual target 12a from the state shown in FIG. 3A to the ineffective state, the port ID number 101 is released as shown in FIG. 3B. At that time, the states of the rest of the virtual targets 12b and 12c are held, and the dummy virtual target 13a, which corresponds to the designated virtual target 12a, is put into the effective state. Thus, the port ID number 101 is sure to be assigned to the dummy virtual target 13a.

Then, if the virtual target 12c is put into the ineffective state, the port ID number 301, which has been assigned to the virtual target 12c, is assigned to the dummy virtual target 13c, which corresponds to the virtual target 12c, as shown in FIG. 3C.

In case of changing the state of the designated virtual target to the effective state, firstly the second control means 24 holds the states of the rest of the virtual targets so as not to change the states thereof. Successively, the second control means 24 makes the virtual target constituting means 30 put the dummy virtual target, which corresponds to the designated virtual target, into the ineffective state and put the designated virtual target into the effective state. Then, the second control means 24 releases the rest of the virtual targets.

In case that the virtual target 12c is firstly returned from the state shown in FIG. 3C to the effective state, the corresponding dummy virtual target 13c is put into the ineffective state and the port ID number 301 is released, and then the virtual target 12c is immediately put into the effective state. Therefore, the port ID number 301 is sure to be assigned to the virtual target 12c as shown in FIG. 3D. The port ID numbers are assigned to the virtual targets 12a and 13a by the same process.

Note that, the correspondence relationships between the port ID numbers, the virtual targets and the dummy virtual targets are managed as table data stored in a memory, e.g., RAM, of the virtual target constituting means 30.

By employing the storage virtualization switch V of the present embodiment, even if the control section 20 cannot directly control the port ID numbers of the virtual targets, the fixed port ID numbers, e.g., 101, 201, 301, are always assigned to the virtual targets 12a, 12b and 12c. Therefore, when the host computer accesses the virtual storage unit, the host computer can securely access the object virtual storage unit with no difficulty.

The control process for switching the virtual targets 12a, 12b and 12c between the effective state and the ineffective state has been described above. In some cases, unwanted virtual targets, which are not used by the host computer 2, should be deleted.

In the computer system including the conventional storage virtualization switches, when the unwanted virtual targets are deleted, the port ID numbers of deleted virtual targets are released. The released ID numbers will be assigned to other virtual targets, which will be put into the effective states later. Namely, the correspondence relationship between the port ID numbers and the virtual targets cannot be kept.

To solve the above described problem of the conventional storage virtualization switches, the second control means 24 of the storage virtualization switch V of the present embodiment controls to put the dummy virtual target, which corresponds to the unwanted virtual target, into the effective state when the unwanted virtual target is deleted by the fourth control means 27. While the unwanted virtual target is deleted and the dummy virtual target is put into the effective state, the states of the rest of the virtual targets are held.

With this action, the port ID number of the deleted virtual target is assigned to the dummy virtual target, so that assigning the port ID number to another virtual target can be prevented.

Next, a second embodiment for easily processing the correspondence relationships between the virtual targets, the dummy virtual targets and the port ID numbers will be explained.

In the above described embodiment, when the virtual target is generated, the corresponding dummy virtual target is generated. In the second embodiment, the third control means 28 makes the virtual target constituting means 30 previously generate the dummy virtual targets, whose number is equal to or more than the maximum number of the virtual targets, before the first control means 26 generates the virtual targets (e.g., turning on the computer system). For example, if the maximum number of the virtual targets of the storage virtualization switch V is 256, 256 dummy virtual targets are previously generated. The virtual target constituting means 30 receives the instruction from the third control means 28 and generates 256 dummy virtual targets with independent port ID numbers. Further, the third control means 28 assigns unique management numbers, e.g., 1-256, to the dummy virtual targets and stores the data in a memory.

The first control means 26 assigns unique management numbers, e.g., 1-256, to the generated virtual targets and stores the data in a memory. Each means in the control section 20 treats the virtual target and the dummy virtual target having the same management number as one pair.

In the second embodiment, when the virtual target is generated, the second control means 24 puts one of the dummy virtual targets, which corresponds to the virtual target to be generated, into the ineffective state, and then generates the virtual target in the effective state, or the second control means 24 generates the virtual target, which corresponds to the one of the dummy virtual targets, in the ineffective state, puts the dummy virtual target into the ineffective state, and puts the virtual target into the effective state.

By employing the second embodiment, the port ID numbers assigned to the dummy virtual targets can be securely correctly transferred to the corresponding virtual targets newly generated. By using the management numbers, the first control means 26, the second control means 24, the third control means 28 and the fourth control means 27, etc. can easily manage the correspondence relationships between the virtual targets and the dummy virtual targets and easily generate and delete the virtual targets.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A storage virtualization switch, comprising:
   a plurality of physical ports, to which one or more host computers and one or more physical storage units can be connected;
   storage virtualization means for constituting one or more virtual storage units by using a part or a whole of a storage area of a physical storage unit;
   virtual target constituting means for constituting one or more virtual targets, which acts as a target of a virtual storage unit with respect to a host computer;
   first control means for controlling said virtual target constituting means to generate a virtual target;
   second control means for controlling said virtual target constituting means to selectively put the virtual target into an effective state, in which the virtual target is allowed to be connected to the host computer, or an ineffective state, in which the virtual target is prohibited to be connected to the host computer; and
   third control means for controlling said virtual target constituting means to generate one or more dummy virtual targets, which corresponds to the one or more virtual targets, and for controlling said virtual target constituting means to set a World Wide Name (WWN), which is not recognized by the host computer, as a WWN of a dummy virtual target,
   wherein said virtual target constituting means assigns a port ID number to the virtual target when the virtual target is put into the effective state,
   said virtual target constituting means releases the port ID number of the virtual target when the virtual target is put into the ineffective state,
   said second control means puts the dummy virtual target, which corresponds to the virtual target, into the effective state after the virtual target is put into the ineffective state when the virtual target is put into the ineffective state, and
   said second control means puts the virtual target into the effective state after the dummy virtual target, which corresponds to the virtual target, is put into the ineffective state when the virtual target is put into the effective state.

2. The Storage virtualization switch according to claim 1, wherein said second control means holds the states of other virtual targets when the states of the one virtual and the dummy virtual target, which corresponds to the one virtual target, are changed.

3. The storage virtualization switch according to claim 1, wherein said virtual target constituting means assigns the smallest released port ID number to the virtual target if released port ID number or numbers exist, and said virtual target constituting means generates a new port ID number, which is the next serial number following the latest port ID number, and assigns the same to the virtual target if no released port ID number exist, when said second control means puts the virtual target into the effective state.

4. The storage virtualization switch according to claim 1, further comprising fourth control means for controlling said virtual target constituting means to delete the virtual target, wherein said second control means puts the dummy virtual target, which corresponds to the virtual target, into the effective state when the virtual target is deleted.

5. The storage virtualization switch according to claim 4, wherein said third control means makes said virtual target constituting means generate the dummy virtual targets, whose number is equal to or more than the maximum number of the virtual targets, before said first control means generates the virtual targets, and
said second control means puts one of the dummy virtual targets into the ineffective state, and generates the virtual target in the effective state, or said second control means generates the virtual target, which corresponds to the one of the dummy virtual targets, in the ineffective state, puts the dummy virtual target into the ineffective state and puts the virtual target into the effective state.

6. The storage virtualization switch according to claim 1, wherein said second control means monitors conditions of the physical storage unit and paths connected to the physical storage unit and makes said virtual target constituting means change the state of the virtual target, which corresponds to the physical storage unit or path whose condition is varied, on the basis of the variation of the monitored condition.

* * * * *

UNITED STATES PATENT AND TRADEMARK OFFICE
CERTIFICATE OF CORRECTION

PATENT NO. : 7,774,570 B2  Page 1 of 1
APPLICATION NO. : 11/848952
DATED : August 10, 2010
INVENTOR(S) : Tetsuya Kinoshita et al.

It is certified that error appears in the above-identified patent and that said Letters Patent is hereby corrected as shown below:

Column 10, Line 24 delete "Storage" and insert --storage--.

Signed and Sealed this

Seventh Day of December, 2010

David J. Kappos
*Director of the United States Patent and Trademark Office*